(12) United States Patent
Takada

(10) Patent No.: US 7,848,191 B2
(45) Date of Patent: Dec. 7, 2010

(54) OPTICAL DISK APPARATUS

(75) Inventor: Naoto Takada, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1187 days.

(21) Appl. No.: 11/482,126

(22) Filed: Jul. 7, 2006

(65) Prior Publication Data
US 2007/0008845 A1    Jan. 11, 2007

(30) Foreign Application Priority Data
Jul. 11, 2005    (JP)    ............... 2005-201723

(51) Int. Cl.
*G11B 5/00* (2006.01)
*G11B 20/10* (2006.01)
(52) U.S. Cl. ............ 369/47.11; 369/53.21; 705/50
(58) Field of Classification Search ......... 369/47.11, 369/53.21; 705/50, 52; 345/172, 169
See application file for complete search history.

(56) References Cited

U.S. PATENT DOCUMENTS 6,738,047 B2 *    5/2004    Kobayashi ............. 345/172

2002/0120861 A1 *    8/2002    Kagiwada et al. ......... 713/200
2004/0083178 A1 *    4/2004    Tanaka et al. ............ 705/50

FOREIGN PATENT DOCUMENTS

JP    2003-162884    6/2003

* cited by examiner

*Primary Examiner*—Peter Vincent Agustin
*Assistant Examiner*—Kim-Kwok Chu
(74) *Attorney, Agent, or Firm*—Pillsbury Winthrop Shaw Pittman, LLP

(57) ABSTRACT

An optical disk apparatus is provided with a recording/reading unit that records data and reads recorded data with respect to an optical disk. Further, the optical disk apparatus is provided with a control unit that judges whether an account name recorded on the optical disk matches an account name selected by the operation unit. The control unit permits the recording/reading unit to record data to the optical disk if the account names match. And the control unit prohibits the recording/reading unit from recording data to the optical disk if it is judged that the account names do not match.

4 Claims, 7 Drawing Sheets

OPTICAL DISK APPARATUS

CROSS REFERENCE

This Nonprovisional application claims priority under 35 U.S.C. §119(a) on Patent Application No. 2005-201723 filed in Japan on Jul. 11, 2005, the entire contents of which are hereby incorporated by reference.

BACKGROUND OF THE INVENTION

The present invention relates to an optical disk apparatus that reads data recorded on an optical disk such as a DVD (Digital Versatile Disk) or a CD (Compact Disk) and records data.

Heretofore, optical disk apparatuses that record data such as video and audio, and read (playback or reproduce) recorded data with respect to optical disks such as DVD and CD have become commercially viable and are in widespread use. Optical disks include CD-R, DVD-R, DVD+R, DVD-RAM, CD-RW and DVD-RW for recording (hereinafter, "recordable optical disk") and CD-ROM and DVD-ROM for playback only (hereinafter, "read-only optical disk"). Further, recordable optical disks include write-once optical disks such as CD-R, DVD-R and DVD+R, and rewritable optical disks such as DVD-RAM, CD-RW and DVD-RW.

These optical disks have played a key role in the IT era due to their high compatibility.

For example, a user who has recorded data such as video and audio to a recordable optical disk using one particular optical disk apparatus can playback the data recorded on the recordable optical disk using a different optical disk apparatus. Further, the user is also able to record data such as video and audio to the recordable optical disk using a different optical disk apparatus.

On the other hand, optical disk apparatuses such as that described in JP 2003-162884A have been proposed.

However, in the above conventional example, problems also arise from this high compatibility. For example, in the case where a first user (user A) has recorded his or her favorite video or audio data to a recordable optical disk, it is possible that another user (user B) might record data to the recordable disk by mistake. This problem is compounded in the case of a rewritable disk in that data recorded as one's favorite could possibly be overwritten.

Thus, a problem with conventional optical disk apparatuses was that user B might record data to user A's optical disk by mistake. Or user A might record data to user B's optical disk by mistake.

The optical disk apparatus shown in JP 2003-162884A, in which the usable capacity of an optical disk is set for each user, is premised on the sharing of a single optical disk by a plurality of users. This optical disk apparatus is thus similar to the above conventional optical disk apparatuses in the sense that someone else's data may be recorded to user A's optical disk. Consequently, with this optical disk apparatus, problems similar to the above conventional optical disk apparatuses arise.

An object of the present invention is to provide an optical disk apparatus that allows a specific user to have exclusive use of an optical disk loaded in the apparatus body, and prevents recording to the optical disk by anyone other than the specific user.

SUMMARY OF THE INVENTION

An optical disk apparatus pertaining to the present invention is provided with a recording/reading unit that irradiates a laser beam onto an optical disk, and that records data and reads recorded data with respect to the optical disk. In this configuration, the optical disk is a recordable optical disk, examples of which include DVD-R, DVD+R and DVD-RW.

Also, the optical disk apparatus is provided with a storage unit storing one or more pre-registered account names, and an operation unit for selecting one account name from the one or more account names stored in the storage unit.

Further, the optical disk apparatus is provided with a control unit, when recording of data to the optical disk is instructed, for judging whether an account name recorded on the optical disk matches an account name selected by the operation unit. With this configuration, Data recording to an optical disk may involve the recording of a television program, for example.

The control unit performs the following controls.

(1) If it is judged that the account names match, the control unit permits the recording/reading unit to record data to the optical disk.

(2) If it is judged that the account names do not match, the control unit prohibits the recording/reading unit from recording data to the optical disk.

With the above configuration, the control unit judges whether a user has exclusive use of the optical disk loaded in the apparatus body. The control unit determines whether to start data recording to the optical disk depending on this judgment result.

DETAILED DESCRIPTION OF THE INVENTION

An optical disk apparatus according to an embodiment of the present invention is described below.

Figure 1:
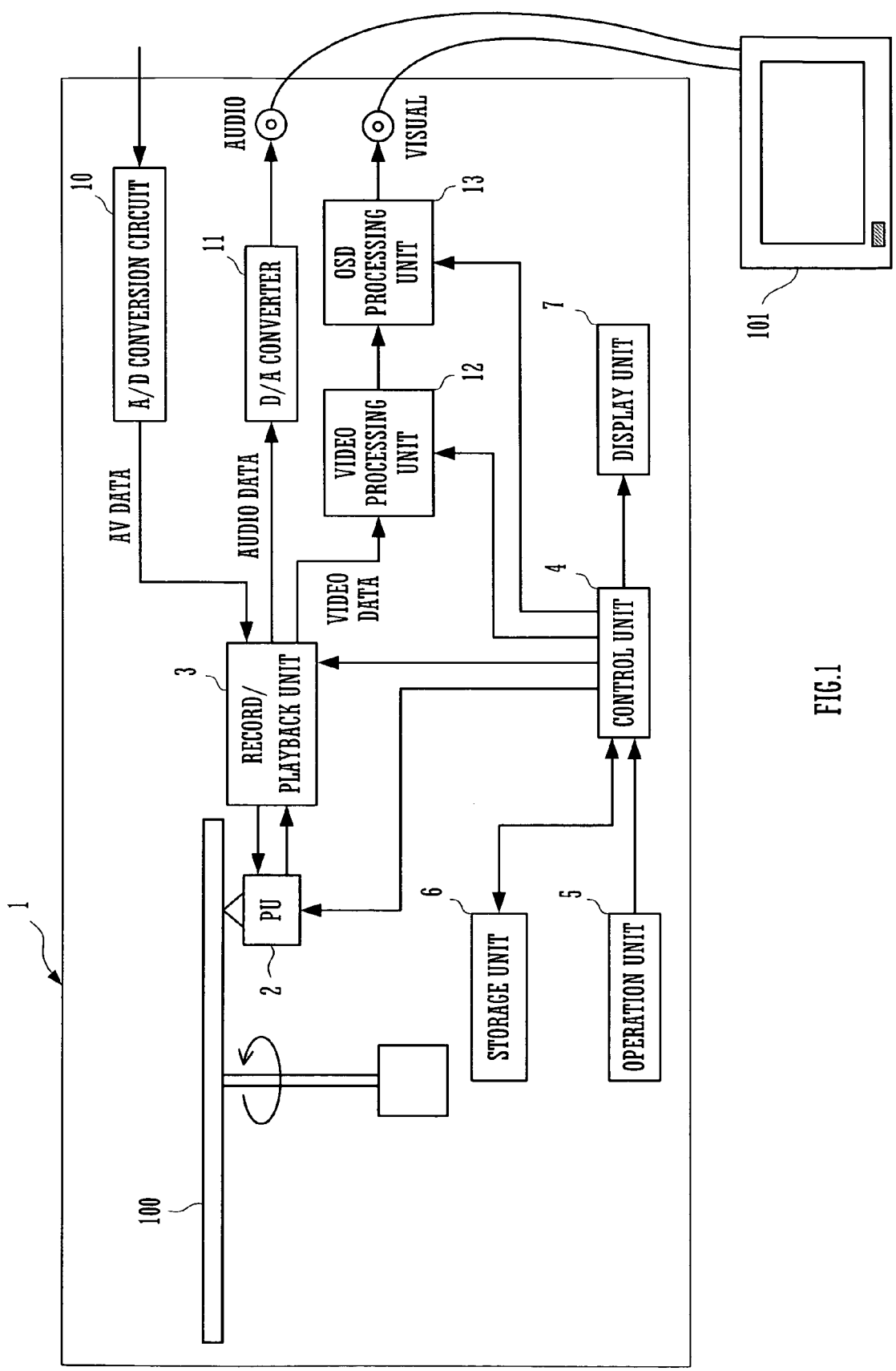
FIG. 1 is a block diagram showing a main configuration of an optical disk apparatus according to an embodiment of the present invention.

FIG. 1 is a block diagram showing a main configuration of an optical disk apparatus according to an embodiment of the present invention. An optical disk apparatus 1 is provided with a control unit 4 that controls an apparatus body 1, a pick-up head 2 (hereinafter, "PU head 2") that records and reads data with respect to an optical disk 100, a record/playback unit 3 having a RF (Radio Frequency) amplifier or the like, an operation unit 5 provided with an audio record key and a video record key, a display unit 7 that displays information, a storage unit 6, a D/A converter 11 that converts audio data to analog playback audio signals, a video processing unit 12 that converts video data to analog playback video signals, an OSD (On Screen Display) processing unit 13 that superimposes text or graphics over the playback video signals, and an A/D conversion circuit 10 that receives TV broadcast signals and acquires AV (Audio Visual) data.

The PU head 2 is provided with a laser diode (LD), a collimator lens, a beam splitter, an objective lens, a photodetector, a thread motor, and an actuator (not depicted).

The PU head 2 is moveably attached to an axis that extends in a radial direction of the optical disk 100. The thread motor moves the PU head 2 in a radial direction of the optical disk 100.

The LD is a light source that outputs laser beams. The photodetector is formed by a plurality of light receiving elements, and detects light reflected from the optical disk 100. Four light receiving areas, for example, are formed in the photodetector.

The objective lens adjusts the irradiation position of the laser beam on the optical disk 100. The actuator moves the objective lens toward and away from the optical disk 100, and in a radial direction of the optical disk 100.

During playback, the PU head 2 irradiates a laser beam of reading power onto the optical disk 100, and detects the light reflected from the optical disk 100 with the photodetector. Information recorded on the optical disk 100 is thereby read optically.

During playback, he record/playback unit 3 generates an RF signal based on the output of the plurality of light receiving elements in the PU head 2, and amplifies the RF signal. The record/playback unit 3 processes the RF signal to extract video and audio data, and decodes the extracted data. Here, the extracted video and audio data is, for example, encoded with MPEG (Moving Picture Expert Group). The record/playback unit 3 then outputs the audio data to the D/A converter 11 and the video data to the video processing unit 12 while synchronizing the data.

The D/A converter 11 converts the decompressed audio data to an analog playback audio signal, and outputs the playback audio signal to an external television 101.

The video processing unit 12 converts the decompressed video data to an analog playback video signal, and outputs the playback video signal. The playback video signal is input to the external television 101 via the OSD processing unit 13.

The OSD processing unit 13 incorporates an OSD image memory (not depicted) that stores text or graphics. The OSD processing unit 13 superimposes text or graphics on the playback video signal based on a control signal transmitted from the control unit 4.

The user is thus able to watch video based on the video signal and listen to audio based on the audio signal output from the optical disk apparatus 1, on the television 101.

On the other hand, during recording, the A/D conversion circuit 10 receives a TV broadcast signal from the antenna of a TV broadcast or the like, digitizes the received signal, and outputs the digitized signal.

The record/playback unit 3 encodes the digitized AV data (e.g., with MPEG), and outputs a digital signal to the PU head 2.

When the digital signal is input from the record/playback unit 3, the PU head 2 controls a laser beam of recording power according to the digital signal, and irradiates it onto the recording surface of the optical disk 100.

The operation unit 5 is for the user to input various commands to the optical disk apparatus 1, and is provided with a plurality of keys. Commands input to the optical disk apparatus 1 by the user are transmitted to the control unit 4.

The plurality of keys include an audio record key (not depicted) for recording audio to the optical disk 100, a video record key (not depicted) for recording video and audio to the optical disk 100, a My Disc register key (not depicted) that is specified in order to record to the optical disk 100 the account name of a user who has exclusive use of the optical disk 100, a select key (not depicted) for selecting an account name, and a cancel key (not depicted).

Here, the My Disc register key corresponds to the "account register key" of the present invention.

The storage unit 6 is configured with an EEPROM or a hard disk, for example.

The storage unit 6 stores a master control program. Further, the storage unit 6 stores one or more pre-registered account names. Further, the storage unit 6 stores the account names in association with settings that have been set when logged in with the account names. The settings may include, for example, image quality for recording.

In other words, the storage unit 6 stores settings in association with individual account names. The master control program is written in such a manner that it lets the apparatus body 1 operate based on the settings associated with individual account names.

When the user next turns power on, the user is thereby able to use the optical disk apparatus 1 with the settings he or she (the user) set last time. Consequently, the user is freed from the troublesome operations to redo the settings every time the optical disk apparatus 1 is turned on.

The display unit 7 displays the time, the setting status of the optical disk apparatus 1, and the like.

The control unit 4 is configured with a microcomputer, for example. The control unit 4 controls the individual units of the optical disk apparatus 1 according to commands input to the optical disk apparatus 1 by the user.

Note that with an actual optical disk apparatus, a tracking servo control to align the irradiation position of the laser beam to the center of the tracks on the optical disk, and a focus servo control to align the focal position of the laser beam on the recording surface of the optical disk are performed when reading and recording data, although illustration of these controls has been omitted in the embodiment of the present invention.

Here, the PU head 2, the record/playback unit 3, and the A/D conversion circuit 10 correspond to the "recording/reading unit" of the present invention.

The recording area of an optical disk is described next. Optical disks include CD-R, DVD-R, DVD+R, DVD-RAM, CD-RW and DVD-RW for recording (hereinafter, "recordable optical disk") and CD-ROM and DVD-ROM for playback only (hereinafter, "read-only optical disk"). Further, recordable optical disks include write-once optical disks such as CD-R, DVD-R and DVD+R, and rewritable optical disks such as DVD-RAM, CD-RW and DVD-RW.

Here, the optical disk 100 is a recordable optical disk.

Figure 2:
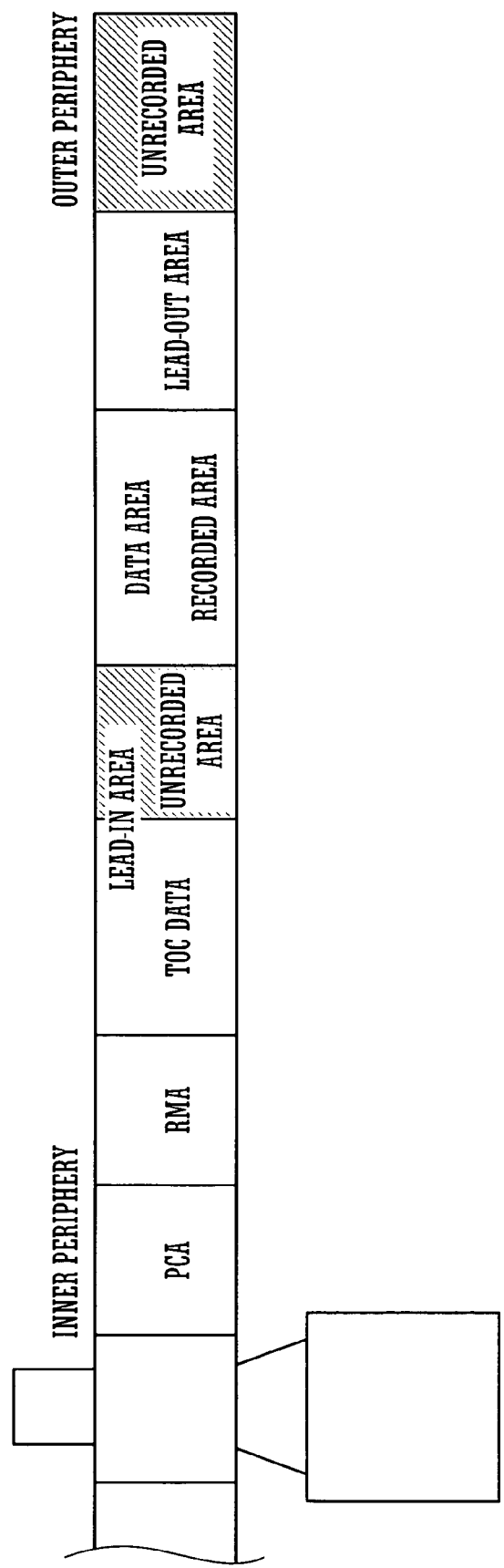
FIG. 2 shows the recording area of a recordable optical disk.

FIG. 2 shows the recording area of a recordable optical disk. The recording area of a recordable optical disk is divided, from inner periphery to outer periphery, into a PCA, a RMA, a lead-in area, a data area, and a lead-out area.

The PCA is where laser power can be calibrated.

The RMA is where recording management information required by the optical disk apparatus 1 is recorded.

The lead-in area is where the TOC data of data recorded in the data area of the optical disk is recorded. TOC data includes information indicating whether saved data has been finalized, the date-time at which data was saved, the title information of saved data, and the address information of data saved on the optical disk.

The data area is where saved data is recorded.

The lead-out area is created when saved data has been finalized. Finalization is a process for preparing the recorded information so that the optical disk is compatible with other optical disk apparatuses. While finalizing saved data enables a recordable optical disk to be played in other optical disk apparatuses, data can no longer be recorded to the optical disk.

Figure 3:
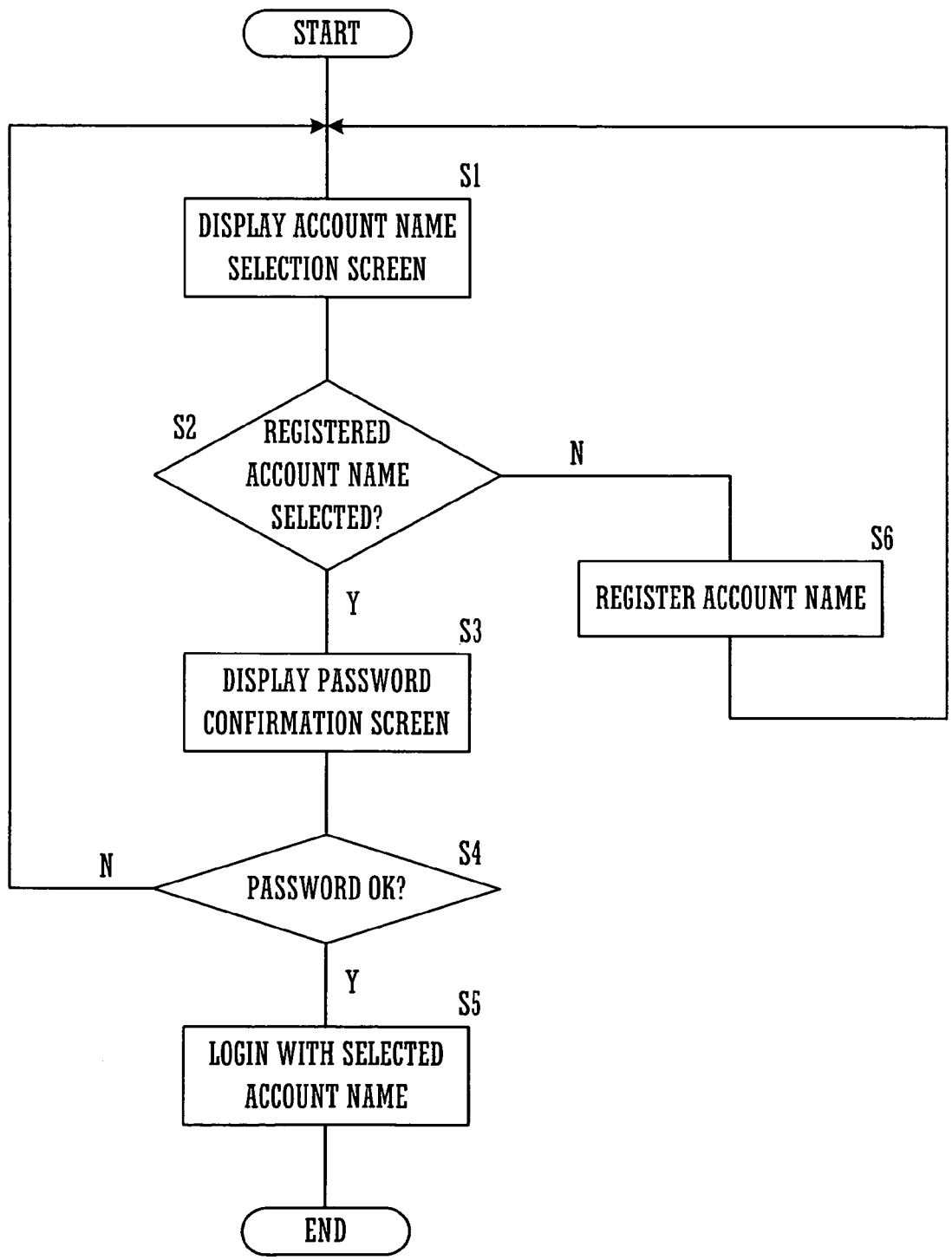
FIG. 3 is a flowchart showing an operation performed by a control unit when power is turned on in an optical disk apparatus according to an embodiment of the present invention.
Figure 4:
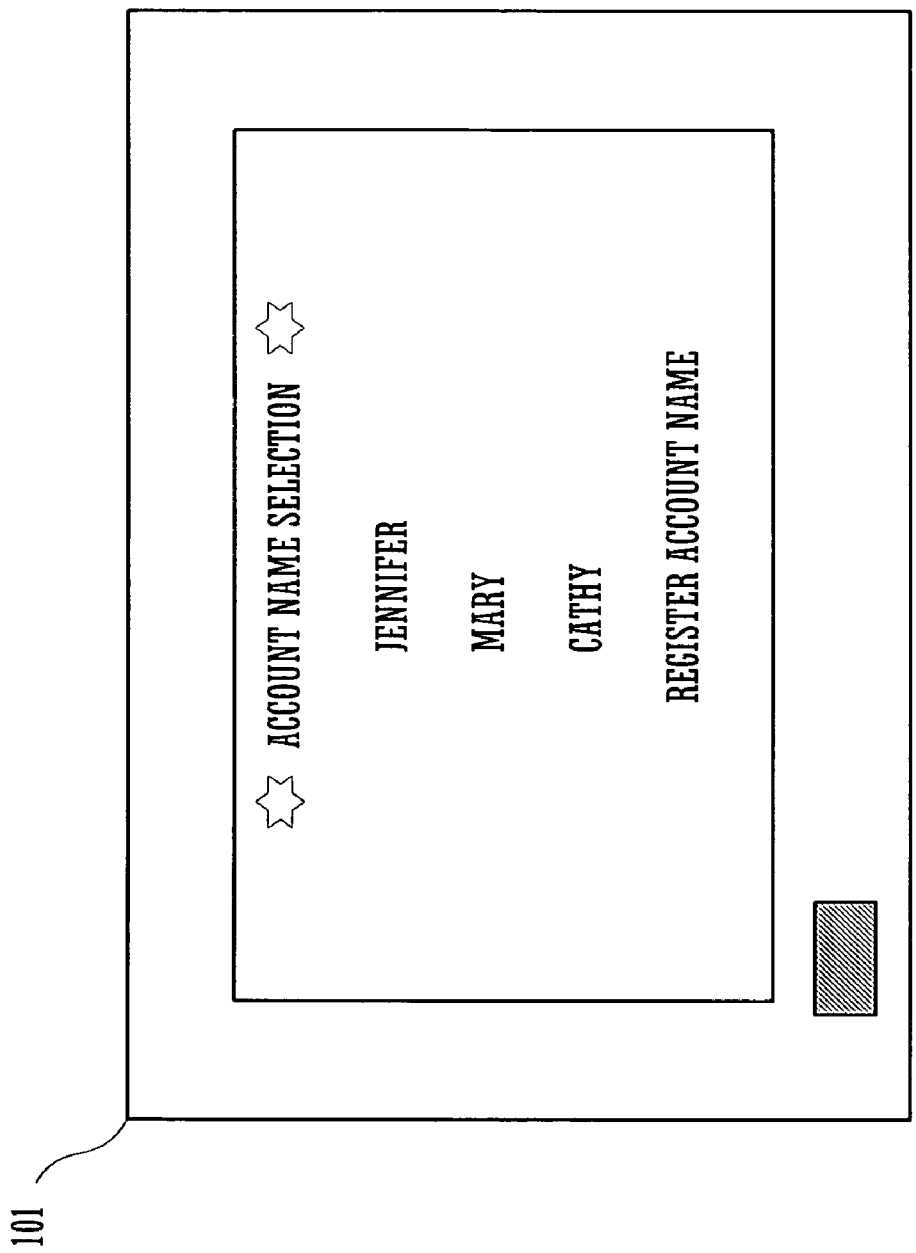
FIG. 4 shows the screen of a television 101 on which a list of account names is displayed.

FIG. 3 is a flowchart showing an operation performed by the control unit when power is turned on in an optical disk apparatus according to an embodiment of the present invention. FIG. 4 shows the screen of the television 101 on which a list of account names is displayed when the apparatus body 1 is started up. The operation in FIG. 3 assumes a situation in which a user selects his or her account name while viewing the screen in FIG. 4, and the control unit 4 logs in with the selected account name.

When the apparatus body 1 is powered on, the control unit 4 instructs the OSD processing unit 13 to perform on-screen display on the television 101 of the account names pre-stored in the storage unit 6 (S1). To elaborate, the control unit 4 records the list of account names pre-stored in storage unit 6 and the background image in the OSD image memory of the OSD processing unit 13. Next, on receiving the instruction from the control unit 4, the OSD processing unit 13 superimposes the list of account names and the background image stored in the OSD image memory on a playback video signal. The list of account names stored in the storage unit 6 and the background image are thus displayed on the screen of the television 101 (see FIG. 4).

The user then selects one account name from the list of account names with the select key of the operation unit 5. Specifically, the user selects one of Jennifer, Mary, or Cathy (see FIG. 4).

Note that account names are pre-registered in the storage unit 6 by users in S6 (described below), for example.

The control unit 4 judges whether a pre-registered account name has been selected (S2). If it is judged that a pre-registered account name has not been selected, or more specifically, if the user selects "Register Account Name" (see FIG. 4), the control unit 4 lets the user register an account name (S6), before returning to S1 and continuing the processing. Specifically, the control unit 4 urges the user to input an account name via a display on the television 101. The control unit 4 then records the input account name to the storage unit 6.

On the other hand, if the user selects a pre-registered account name with the select key of the operation unit 5, the control unit 4 instructs the OSD processing unit 13 to perform on-screen display of a password confirmation screen on the television 101 (S3).

The control unit 4 judges whether the password matches (S4). S3 and S4 are for preventing malicious third parties from logging in using someone else's account name.

Note that the authentication method should be chosen from the standpoint of security. In this embodiment, password authentication is employed because it can be implemented easily and at low cost.

If it is judged in S4 that the password does not match, the control unit 4 returns to S1 and continues the processing.

On the other hand, if it is judged in S4 that the password matches, the control unit 4 logs in based on the selected account name (an account name selected by the operation unit) (S5), and ends the processing.

Thus, even if a plurality of users use a single optical disk apparatus 1, they can login with an account name they registered themselves.

Figure 5:
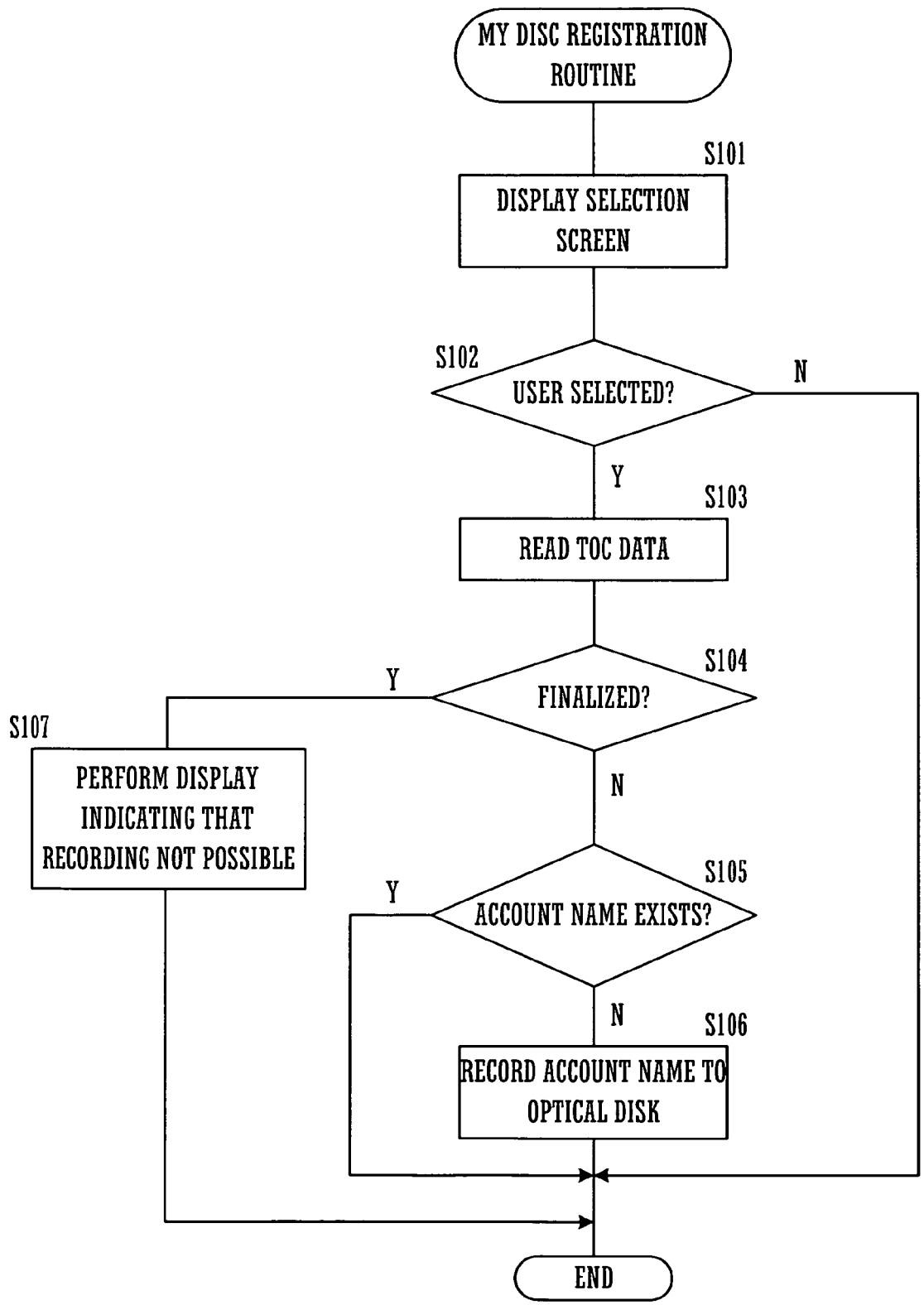
FIG. 5 is a flowchart showing an operation performed by a control unit when a My Disc register key is depressed in an optical disk apparatus according to an embodiment of the present invention.
Figure 6:
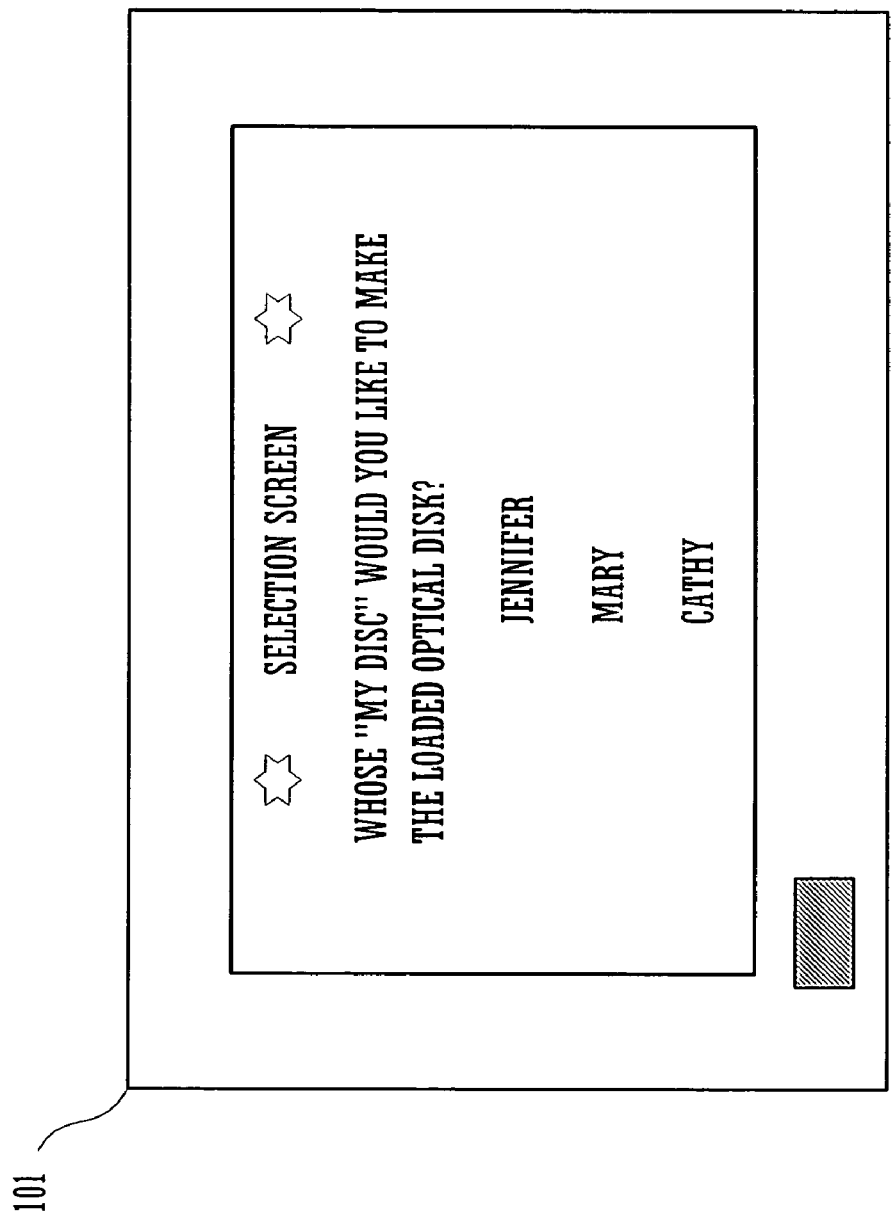
FIG. 6 shows the screen of a television 101 on which a list of account names is displayed.

FIG. 5 is a flowchart showing an operation performed by the control unit when the My Disc register key is depressed in an optical disk apparatus according to an embodiment of the present invention. FIG. 6 shows the screen of the television 101 on which a list of account names is displayed when the My Disc register key is depressed. The operation in FIG. 5 assumes a situation in which a user depresses the My Disc register key of the operation unit 5, and decides on a user to have exclusive use of the optical disk 100.

When the My Disc register key is depressed with the optical disk 100 loaded in the apparatus body 1, the control unit 4 executes a My Disc registration routine (an account name recording operation).

When the My Disc registration routine is executed, the control unit 4 instructs the OSD processing unit 13 to perform on-screen display of a selection screen on the television 101 (S101, see FIG. 6). The selection screen allows the user to select who will have exclusive use of the optical disk 100 as "My Disc". The selection screen may, for example, be "Whose 'My Disc' would you like to make the loaded optical disk?" The user then selects in the operation unit 5 the user they want to have exclusive use of the optical disk 100.

The control unit 4 judges whether a user to have exclusive use has been selected in the operation unit 5 (S102). If a user to have exclusive use has not been selected in the operation unit 5 (e.g., user has depressed the cancel key), the control unit 4 ends the processing.

On the other hand, if a user to have exclusive use has been selected in the operation unit 5, the control unit 4 causes the PU head 2 to read the TOC data in the lead-in area of the optical disk 100 (S103).

The control unit 4 judges whether the optical disk 100 has been finalized (S104). This judgment is performed by checking whether the address data of the lead-out area exists in the lead-in area or by examining the RMA.

If it is judged in S104 that the optical disk 100 has not been finalized, the control unit 4 judges whether an account name is contained in the TOC data read from the lead-in area in S103 (S105).

If it is judged that an account name is contained, the control unit 4 ends the processing. This judgment result implies that another person has exclusive use of the loaded optical disk 100.

On the other hand, if it is judged that an account name is not contained, the control unit 4 instructs the PU head 2 to record the account name selected at S102 to the lead-in area of the optical disk 100 (S106), and ends the processing.

As a result, the exclusive use of the optical disk 100 will be held by the user whose account name was selected at S102.

Note that in this embodiment the account name is recorded in the lead-in area of the optical disk 100, although it also may be recorded in the data area.

On the other hand, if it is judged in S104 that the optical disk 100 has been finalized, the control unit 4 instructs the OSD processing unit 13 to perform on-screen display with the television 101 indicating that the account name cannot be recorded to the optical disk 100 (S107), and ends the processing. S107 is provided because data cannot be recorded to an optical disk that has been finalized.

Figure 7:
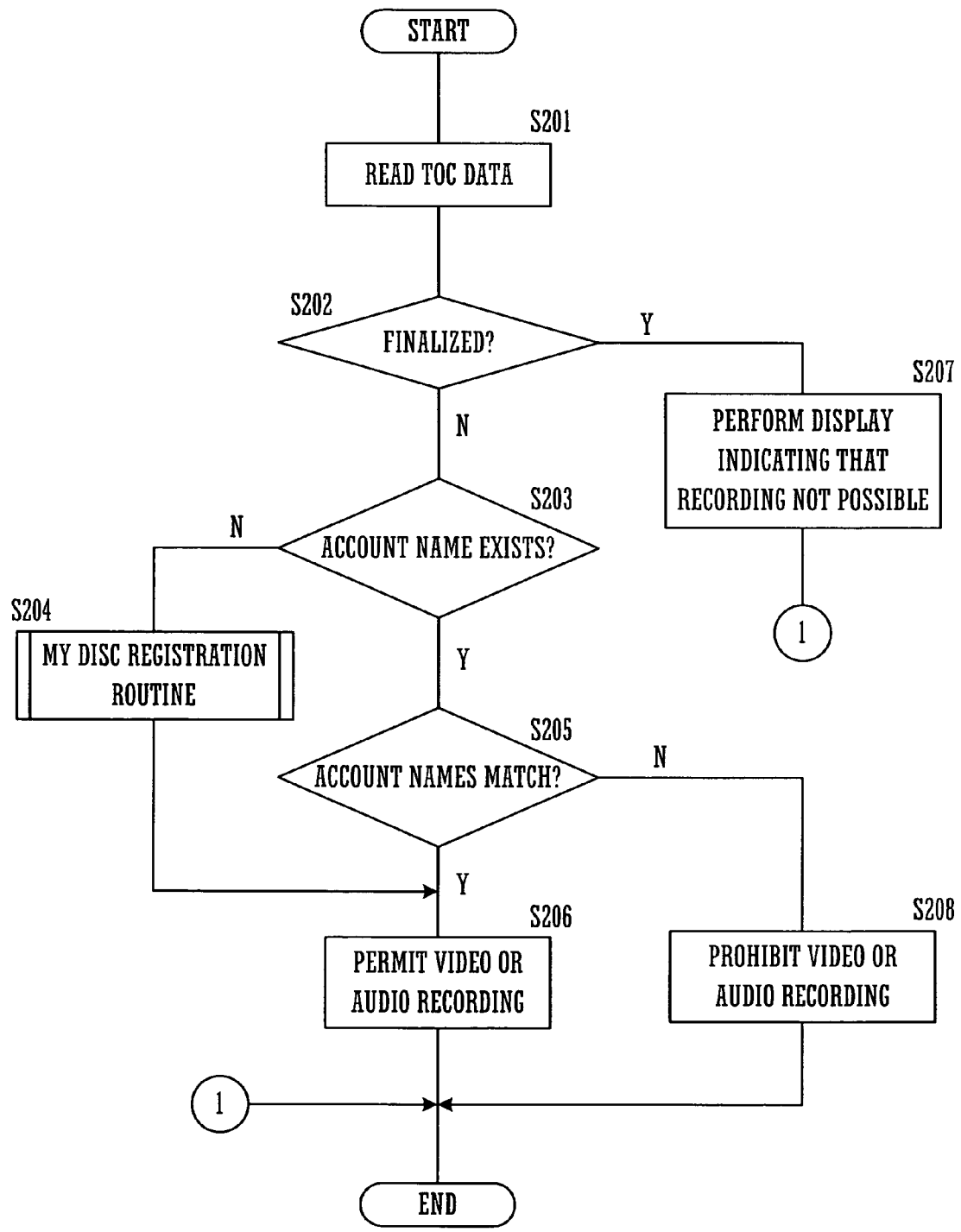
FIG. 7 is a flowchart showing an operation performed by a control unit when an audio record key or video record key is depressed in an optical disk apparatus according to an embodiment of the present invention.

FIG. 7 is a flowchart showing an operation performed by the control unit when the audio record key or video record key is depressed in an optical disk apparatus according to an embodiment of the present invention. This operation assumes a situation in which the video record key or audio record key of the operation unit 5 is depressed after login with the optical disk 100 loaded in the optical disk apparatus 1, and video recording or audio recording to the optical disk 100 is to be performed.

Note that the operation in FIG. 7 is also performed when timer recording has been preset by a user and the preset time has arrived. In this case, the control unit 4 logs in with the account name used for setting the timer recording when the preset time arrives.

When the video record key or audio record key of the operation unit 5 is depressed with the optical disk 100 loaded in the apparatus body 1, the control unit 4 causes the PU head 2 to read the TOC data in the lead-in era of the optical disk 100 (S201). This processing is the same as S103 in FIG. 5.

The control unit 4 judges whether the optical disk 100 has been finalized (202). The method of judging is the same as S104 in FIG. 5.

If it is judged that the optical disk 100 has been finalized, the control unit 4 instructs the OSD processing unit 13 to perform on-screen display on the television 101 indicating that data cannot be recorded to the optical disk 100 (S207), and ends the processing. S207 is provided for the same reason as S107.

On the other hand, if it is judged that the optical disk 100 has not been finalized, the control unit 4 judges whether an account name is contained in the TOC data read in S201 (S203). The method of judging is the same as S105 in FIG. 5.

On judging that an account name is contained, the control unit 4 judges whether the account name in the TOC data read in S201 matches the account name currently logged in (an account name selected by the operation unit)(S205).

If it is judged that the account names match, the control unit 4 permits the PU head 2 and the record/playback unit 3 to record data to the optical disk 100 (S206), and ends the processing. Specifically, the control unit 4 instructs the PU head 2 and the record/playback unit 3 to record data to the optical disk 100. Data recording to the optical disk 100 is thereby commenced.

On the other hand, if it is judged in S205 that the account names do not match, the control unit 4 prohibits the PU head 2 and the record/playback unit 3 from recording data to the optical disk 100 (S208), and ends the processing. Specifically, the control unit 4 disregards any commands related to video or audio recording input in the operation unit 5. It is thus possible to allow a specific user to have exclusive use of the optical disk 100 loaded in the apparatus body 1, and to prevent parties other than the specific user from recording to the optical disk 100.

Note that while the operations performed when recording video and audio (binary data) are described in this embodiment, the present invention can also be applied in recording text data.

Also, at S208, the control unit 4 preferably instructs the OSD processing unit 13 to perform on-screen display on the television 101 indicating that video and audio recording is not possible. Messages that convey the fact that video or audio recording is not possible include, "Recording not possible. Account names do not match" or "Recording not possible. This is Mary's optical disk", for example. Here, "Mary" is the account name read from the optical disk 100 in S201.

Informing the user that video or audio recording is not possible enables the user to be aware that recording to the optical disk 100 is not possible. Further, informing the user of the account name read from the optical disk 100 also enables the user to be aware of whose disk the optical disk 100 is.

On the other hand, when it is judged in S203 that an account name is not contained, the control unit 4 executes the My Disc registration routine (S204). When the My Disc registration routine is executed, the control unit 4 proceeds to S206 after completing an operation that excludes S103, S104 and S105, and continues the processing. Here, S103, S104 and S105 in FIG. 5 are excluded because the same processing has already been performed in S201, S202 and S203 in FIG. 7.

Note that in this embodiment, the fact that recording cannot be performed and the list of account names are displayed on the television 101 as a display device, but it is also possible to display them on the display unit 7.

Finally, the description of the foregoing embodiment is in all respects illustrative and not limiting. The scope of the invention is indicated by the scope of the claims rather than by the foregoing embodiment. Further, all changes which come within the meaning and range of equivalency of the claims are intended to be embraced in the scope of the invention.

What is claimed is:

1. An optical disk apparatus comprising:
   a receiving unit for receiving TV broadcast signals and acquiring data from the TV broadcast signals;
   a recording/reading unit for irradiating a laser beam onto an optical disk, recording the data acquired by the receiving unit to the optical disk, and reading recorded information from the optical disk;
   a storage unit for storing one or more pre-registered account names;
   an operation unit including
      an account register key for selecting an account name recording operation in which an account name of a user having exclusive use of the optical disk is recorded to the optical disk, and
      a select key for selecting a single account name from the one or more account names stored in the storage unit; and
   a control unit which judges whether the account name is already recorded to the optical disk when the account name recording operation is selected by the account register key, and which instructs the recording/reading unit to record the account name of the user to the optical disk when judging that the account name is not recorded to the optical disk,
   wherein the control unit
   judges whether the account name recorded to the optical disk matches the single account name selected by the select key when recording of the data acquired by the receiving unit to the optical disk is instructed, and
   permits the recording/reading unit to record the data to the optical disk if it is judged that the account names match, and prohibits the recording/reading unit from recording the data to the optical disk if it is judged that the account names do not match.

2. The optical disk apparatus according to claim 1, wherein when audio recording or video recording of the data acquired by the receiving unit to the optical disk is instructed, the control unit judges whether the account name recorded to the optical disk matches the account name selected by the select key.

3. The optical disk apparatus according to claim 1,
   further comprising a display device that displays information,
   wherein, if it is judged that the account names do not match, the control unit displays on the display device the fact that recording is not possible.

4. The optical disk apparatus according to claim 1, wherein the recording/reading unit:
   records in a lead-in area of the optical disk the account name when the account name recording operation is selected by the account register key; and
   reads out the account name from the lead-in area of the optical disk when recording of the data acquired by the receiving unit to the optical disk is instructed.

* * * * *